United States Patent
Kim et al.

(10) Patent No.: US 12,162,218 B2
(45) Date of Patent: Dec. 10, 2024

(54) MODULAR EXPANDABLE 3D PRINTER

(71) Applicant: THE BOARD OF REGENTS OF THE NEVADA SYSTEM OF HIGHER EDUCATION ON BEHALF OF THE UNIVERSITY OF NEVADA, LAS VEGAS, Las Vegas, NV (US)

(72) Inventors: Kwang J. Kim, Henderson, NV (US); Alexandrea Washington, Las Vegas, NV (US); Emma Chao, Henderson, NV (US); Justin Neubauer, Las Vegas, NV (US); Sophia Leon, Las Vegas, NV (US); Zachary Frank, Las Vegas, NV (US); Zakai Olsen, Las Vegas, NV (US)

(73) Assignee: THE BOARD OF REGENTS OF THE NEVADA SYSTEM OF HIGHER EDUCATION ON BEHALF OF THE UNIVERSITY OF NEVADA, LAS VEGAS, Las Vegas, NV (US)

( * ) Notice: Subject to any disclaimer, the term of this patent is extended or adjusted under 35 U.S.C. 154(b) by 684 days.

(21) Appl. No.: 17/428,424

(22) PCT Filed: Dec. 4, 2019

(86) PCT No.: PCT/US2019/064389
§ 371 (c)(1),
(2) Date: Aug. 4, 2021

(87) PCT Pub. No.: WO2020/163009
PCT Pub. Date: Aug. 13, 2020

(65) Prior Publication Data
US 2022/0105680 A1   Apr. 7, 2022

Related U.S. Application Data

(60) Provisional application No. 62/802,032, filed on Feb. 6, 2019.

(51) Int. Cl.
*B29C 64/25* (2017.01)
*B29C 64/209* (2017.01)
(Continued)

(52) U.S. Cl.
CPC ............ *B29C 64/25* (2017.08); *B29C 64/209* (2017.08); *B29C 64/295* (2017.08); *B33Y 30/00* (2014.12)

(58) Field of Classification Search
CPC .................................................... B29C 64/25
See application file for complete search history.

(56) References Cited

U.S. PATENT DOCUMENTS

2015/0145174 A1   5/2015  Comb
2016/0067920 A1*  3/2016  Fontaine ............... B29C 64/106
                                                                 264/255

(Continued)

FOREIGN PATENT DOCUMENTS

CN       104149349 A     11/2014
CN       205439274 U      8/2016
(Continued)

OTHER PUBLICATIONS

3DPrint.com, 3D Printer Made of Legos Which Prints Using Only Legos, https://www.youtube.com/watch?v=zSL88csT88M (Mar. 5, 2015) (Year: 2015).*

(Continued)

*Primary Examiner* — Timothy Kennedy
(74) *Attorney, Agent, or Firm* — Michael Best & Friedrich LLP

(57) ABSTRACT

A modular and expandable 3D printer frame includes frame members to be coupled together to form a base defining an inner area. Each frame member includes at least one coupling member to removably couple the frame member to another of the frame members. The printer frame further includes first modular plates to be disposed within the inner area, and second modular plates to be disposed within the inner area and removably coupled to the first modular plates. The first and second modular plates, when coupled together, define a printer footprint.

25 Claims, 12 Drawing Sheets

(51) Int. Cl.
    *B29C 64/295*     (2017.01)
    *B33Y 30/00*     (2015.01)

(56) References Cited

U.S. PATENT DOCUMENTS

| | | | |
|---|---|---|---|
| 2016/0107390 A1 | 4/2016 | Davis et al. | |
| 2017/0350115 A1* | 12/2017 | Rocher | B29C 64/209 |
| 2017/0355139 A1* | 12/2017 | Wolf | B29C 48/802 |
| 2018/0066441 A1* | 3/2018 | Chen-Iun-Tai | E04G 21/0427 |
| 2018/0230703 A1* | 8/2018 | Ma | E04G 21/0427 |

FOREIGN PATENT DOCUMENTS

| | | |
|---|---|---|
| CN | 107553687 A | 1/2018 |
| KR | 20100135125 A | 12/2010 |
| KR | 20120001169 U | 2/2012 |
| KR | 20130004022 U | 7/2013 |
| WO | 2015038072 A1 | 3/2015 |

OTHER PUBLICATIONS

3D Printing Nerd, Lego Mindstorms 3D Printer at Maker Faire 2016, https://www.youtube.com/watch?v=JxRy03Yljw (Jun. 1, 2016) (Year: 2016).*

International Search Report and Written Opinion for Application No. PCT/US2019/064389 dated Apr. 14, 2020 (15 pages).

* cited by examiner

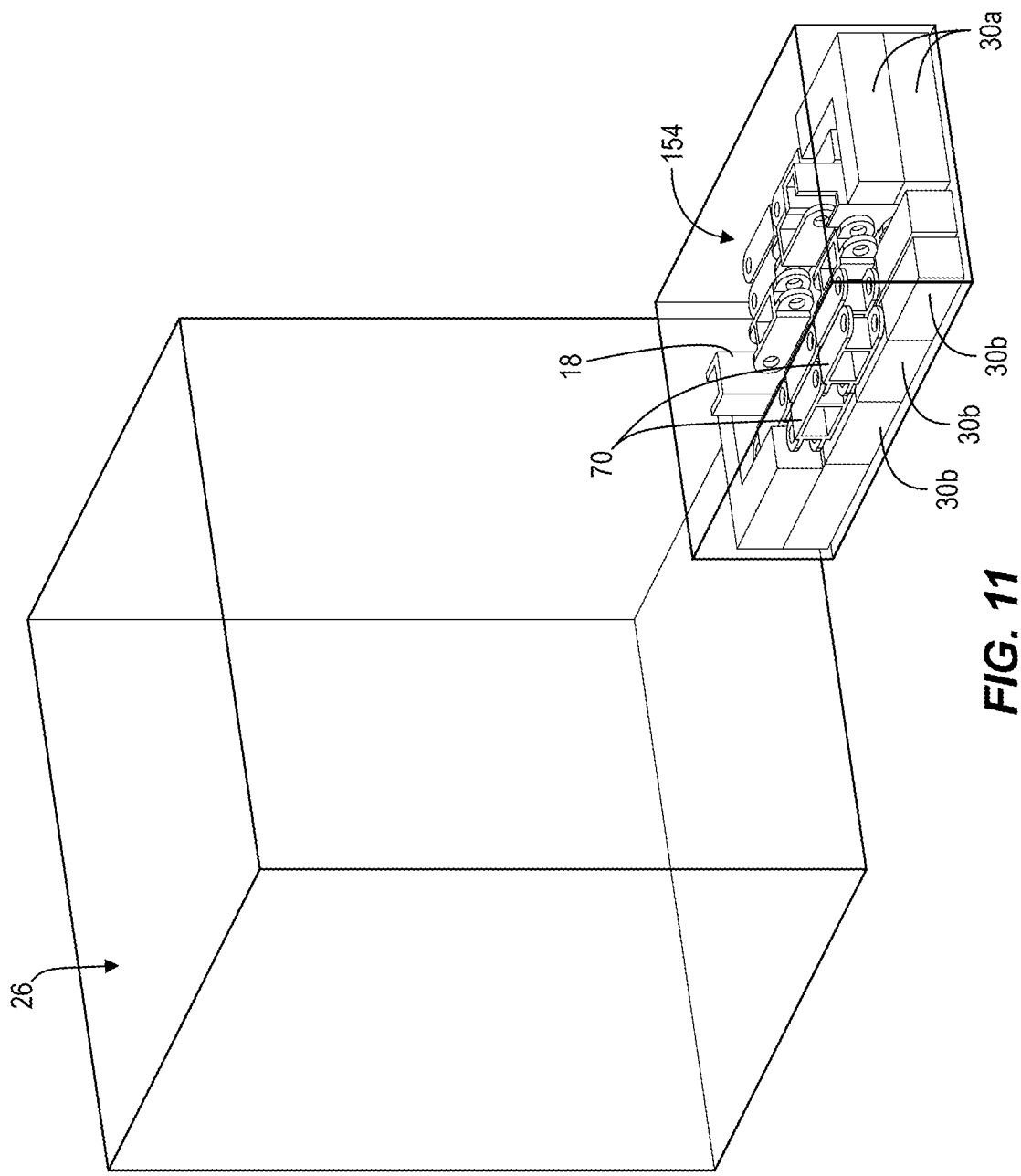

MODULAR EXPANDABLE 3D PRINTER

CROSS-REFERENCE TO RELATED APPLICATIONS

This application is a U.S. national stage entry of International Patent Application No. PCT/US2019/064389, filed on Dec. 4, 2019, which claims priority to U.S. Provisional Patent Application No. 62/802,032, filed on Feb. 6, 2019, the entire contents of each of which are fully incorporated herein by reference.

STATEMENT REGARDING FEDERALLY SPONSORED RESEARCH OR DEVELOPMENT

This invention was made with government support under funding award number 1606547 awarded by NASA/JPL, as well as funding award number 1545857 awarded from NSF. The Government has certain rights in the invention.

BACKGROUND

Three-dimensional (3D) printing has become a popular mode of creating parts or other structures, but is not always convenient. Current 3D printers are generally stationary mechanisms. Printing is thus only done in one location and the size of the print is limited to the footprint and the build volume of the printer. Current 3D printers vary vastly in size, from desktop (e.g., build volume: 4"×4"×4.5") to large scale manufacturing (e.g., build volume: 118"×354"×59") printers. The size of the desired print generally dictates the size of the printer required. Thus, if a wide array of structure sizes (e.g., large and small parts) is needed, a wide array of printers is also required.

FIELD OF THE DISCLOSURE

The present disclosure relates to a modular 3D printing system that allows for an adjustable print volume.

SUMMARY

In one embodiment, a modular and expandable 3D printer frame includes frame members to be coupled together to form a base defining an inner area. Each frame member includes at least one coupling member to removably couple the frame member to another of the frame members. The printer frame further includes first modular plates to be disposed within the inner area, and second modular plates to be disposed within the inner area and removably coupled to the first modular plates. The first and second modular plates, when coupled together, define a printer footprint.

In another embodiment, a modular and expandable 3D printer frame includes a base, and columns extending from the base. Each column is spaced apart from the other columns, and the height of each column is adjustable so as to define a volume between the columns and the base. The printer frame further includes an upper support coupled between adjacent columns, the upper support having removable links to adjust a distance between the adjacent columns. At least one of the links includes a cavity. The upper support includes truss members to be stored within the cavity.

Other aspects of the disclosure will become apparent by consideration of the detailed description and accompanying drawings.

BRIEF DESCRIPTION OF THE DRAWINGS

FIG. 11 is a perspective view of the frame assembly of FIG. 1 is a storage position.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Figure 1:
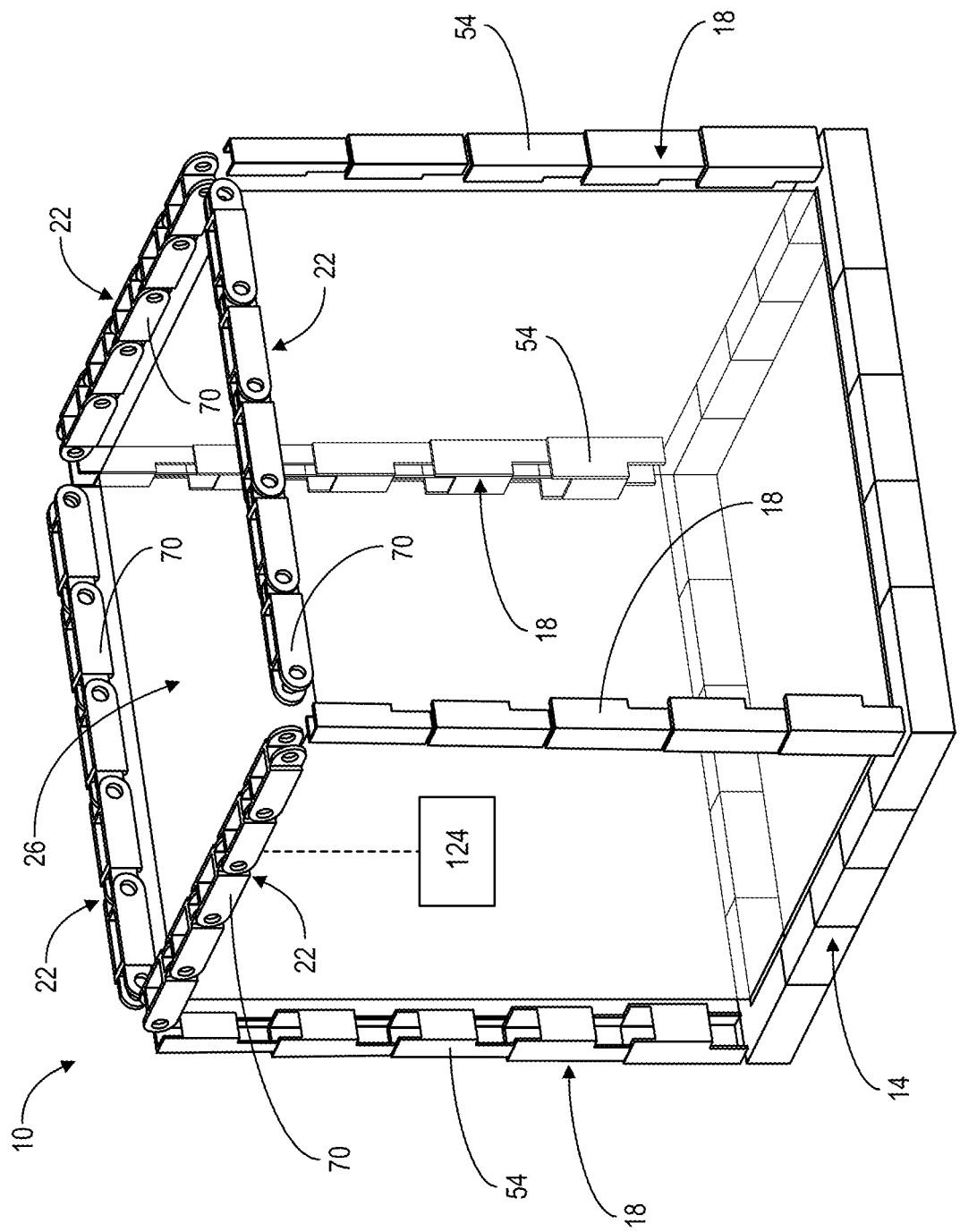
FIG. 1 is a perspective view of a frame assembly of a 3D printer.
Figure 2:
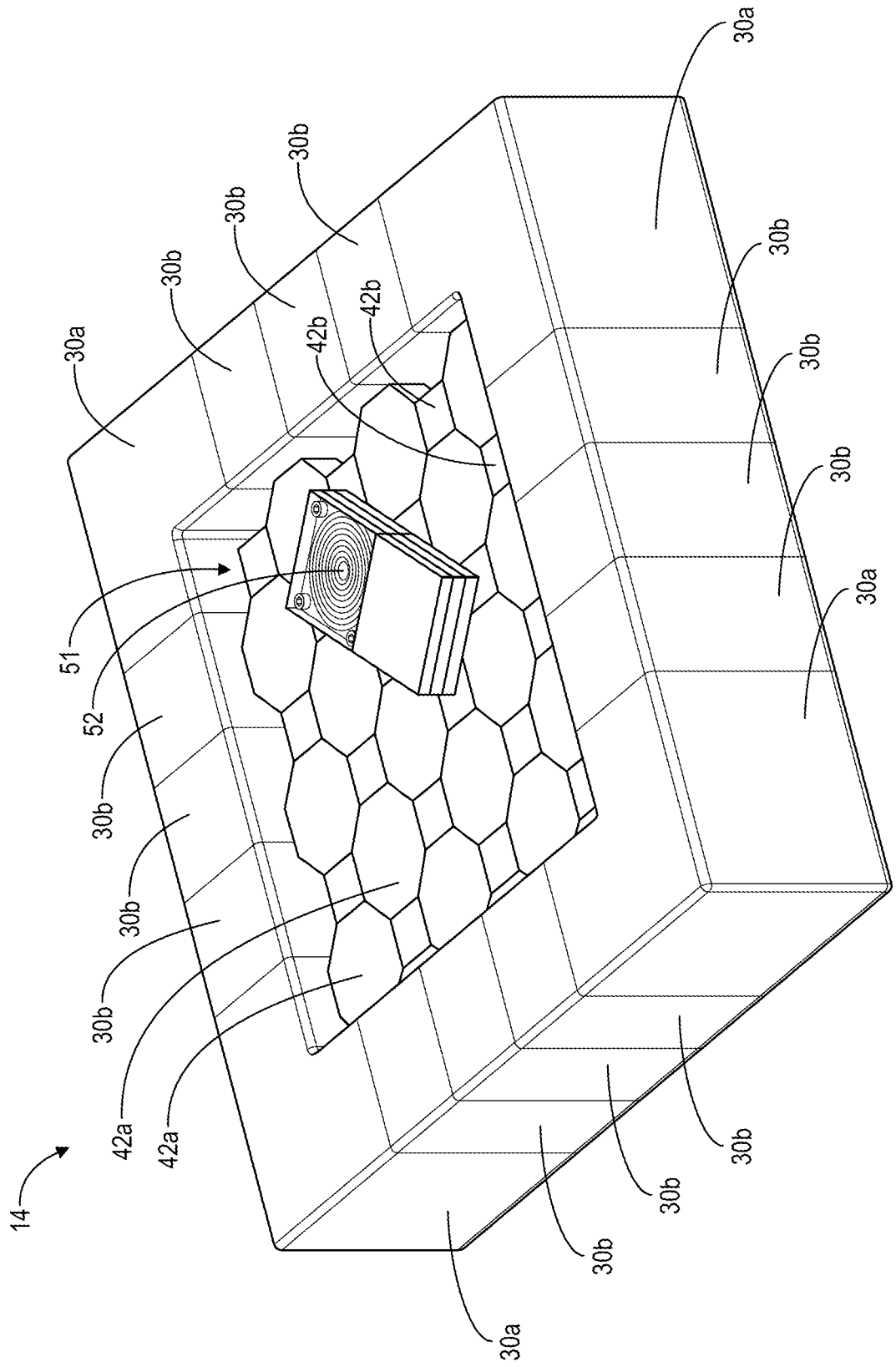
FIG. 2 is a perspective view of a base assembly of the frame assembly of FIG. 1.
Figure 3:
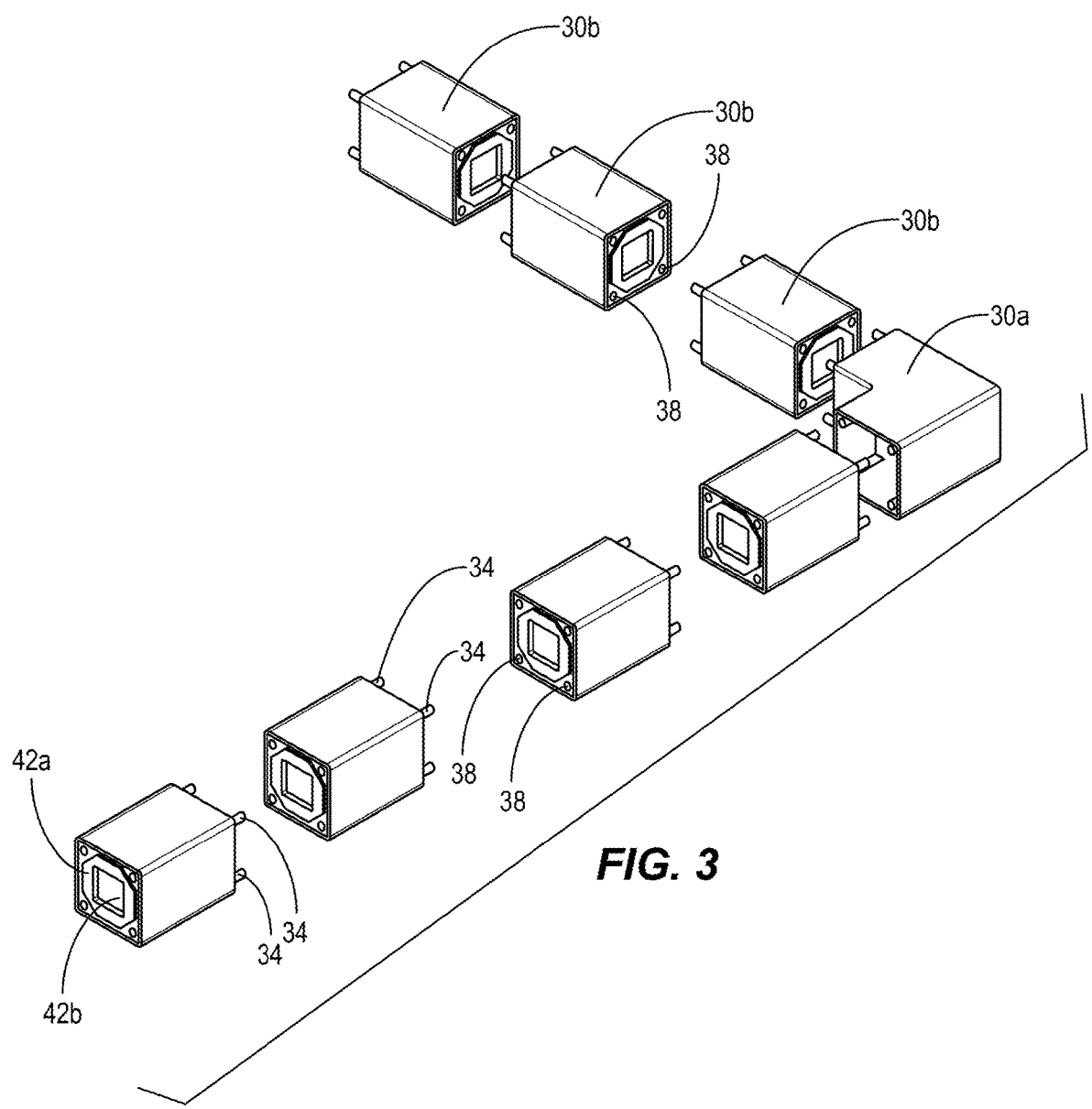
FIG. 3 is an exploded view of frame members of the base assembly of FIG. 2.

FIG. 1 illustrates a frame assembly 10 for a 3D printer. The frame assembly 10 includes a modular bed or base 14, columns 18, and upper supports 22. Together, the frame assembly 10 defines a printer volume 26. In the illustrated embodiment, the printer volume 26 is one meter cubed (e.g., 1 m×1 m×1 m), although other embodiments include various other sizes As shown in FIGS. 2 and 3, the base 14 includes modular tiles 30 (i.e., frame members). In the illustrated embodiment the tiles 30 include corner pieces 30a and straight pieces 30b. The corner pieces 30a have an L-shaped profile and the straight pieces 30b have a rectangular profile, although other embodiments may include different profiles (e.g., U-shaped, etc.). As shown in FIG. 3, each tile 30 includes coupling members to couple the tiles 30 together. For example, in the illustrated embodiment the tile 30 includes a first end with coupling members in the form of projections 34 and a second, opposite end with coupling members in the form of recesses 38. In other embodiments, the projections 34 may be disposed on the second end and the recesses 38 may be disposed on the first end. The projections 34 and recesses 38 are disposed at corners of the tiles 30. The projections 34 of one tile 30 are received within the recesses 38 of another tile 30, to releasably couple the modular tiles 30 together. Other embodiments include different numbers, shapes, and sizes of coupling members than that illustrated.

In the illustrated embodiment, the tiles 30 are coupled together in an end to end manner and define an inner area of the base 14. In the illustrated embodiment, the base 14 is substantially rectangular. One of four corner pieces 30a individually defines one corner of the base 14. Straight pieces 30b are coupled between the corner pieces 30a and define sides of the base 14. As shown in FIG. 2, three straight pieces 30b are used to define each of the sides of the base 14. Depending on the part size needed, this number can be increased or decreased. Changing the number of straight pieces 30b per side changes the perimeter of the base 14. In some embodiments, the number of straight pieces 30b per side may be unequal (e.g., to create a more rectangular base, as opposed to a square base). In other embodiments, straight pieces 30b may not be used, and the corner pieces 30a connect directly to one another.

Figure 4:
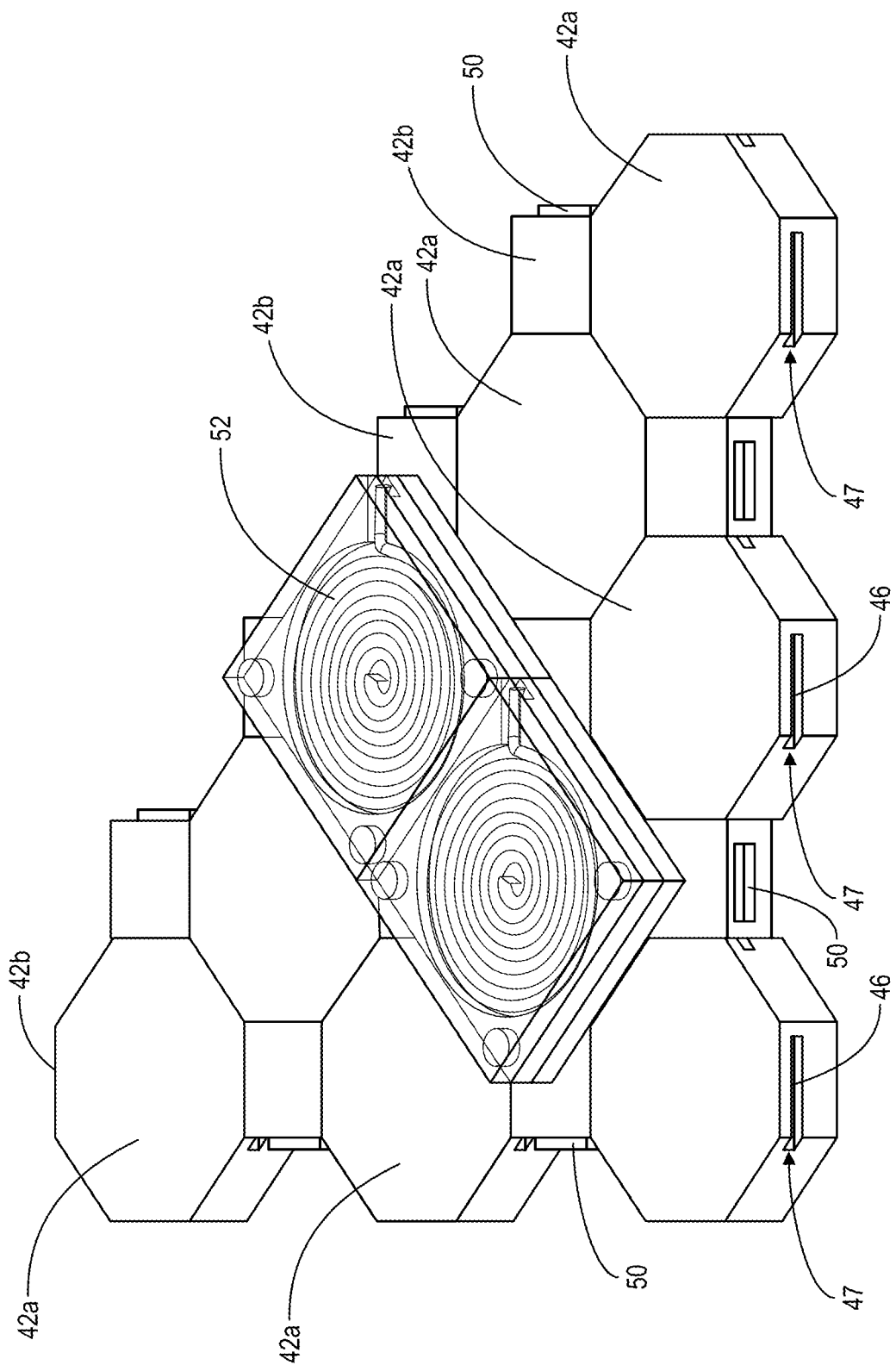
FIG. 4 is a perspective view of modular plates of the base assembly of FIG. 2.

With reference to FIGS. 2 and 4, the base 14 also includes modular plates 42. In the illustrated embodiment, the modular plates 42 include first plates 42a and second plates 42b. The first plates 42a are octagonal and the second plates 42b are square, although in other embodiments the first and second plates 42a, 42b may be any other shape (e.g., hexagonal, rectangular, etc.). The modular plates 42a, 42b are assembled together to form a footprint or print area.

As shown in FIG. 4, channels or grooves 46 are disposed along an outside surface, or perimeter, of the first plates 42a. In the illustrated embodiment, each first plate 42a includes four equally spaced channels 46 (e.g., positioned approximately 90° apart). Elongated projections 50 are disposed along an outside surface, or perimeter, of the second plates 42b. In the illustrated embodiment, each of the square second plates 42b includes four equally spaced projections 50 (e.g., positioned approximately 90° apart). The projections 50 are received within the channels 46. For example, the projections 50 may slide into the channels 46, or may be pressed (e.g., snapped) in place frictionally into the channels 46. As illustrated in FIG. 4, in some embodiments the channels 46 have an open end 47 that receives the projection 50. In some embodiments the projections 50 and/or channels 46 may have shapes (e.g., T-shapes, etc.) that facilitate sliding and retention of the projections 50 within the channels 46. In the illustrated embodiment, each second plate 42b can be coupled to up to four first plates 42a, although other embodiments include different numbers. The first and second plates 42a, 42b are positioned within an inner area 51 (FIG. 2) of the base 14 and may be coupled to the tiles 30a, 30b. In some embodiments, the tiles 30a, 30b include at least one projection or channel. The plates 42a, 42b include the other of the projection or channel (e.g., channel 46 or projection 50). The tiles 30a, 30b are coupled to the plates 42a, 42b in a similar manner as the first plates 42a are coupled to the second plates 42b. Alternatively, the tiles 30a, 30b may couple to the plates 42a, 42b using magnets or a snap fit arrangement. The number of plates 42a, 42b coupled together may be increased or decreased depending on the available inner area 51 (i.e., how many tiles 30a, 30b are coupled together).

With reference to FIG. 4, in the illustrated embodiment the second plates 42b are magnetic. Thus, heating elements 52 and other electronic components may magnetically and releasably connect to upper surfaces of the second plates 42b (e.g., solely by magnetism). In the illustrated embodiment, each heating element 52 is coupled to four of the second plates 42b at corners of the heating element 52. Other embodiments include different numbers and arrangements than that illustrated.

Returning to FIG. 1, the columns 18 are oriented orthogonally with respect to the base 14. In the illustrated embodiment, one column 18 is coupled to each corner piece 30a. Each column 18 includes a plurality of segments 54.

Figure 5:
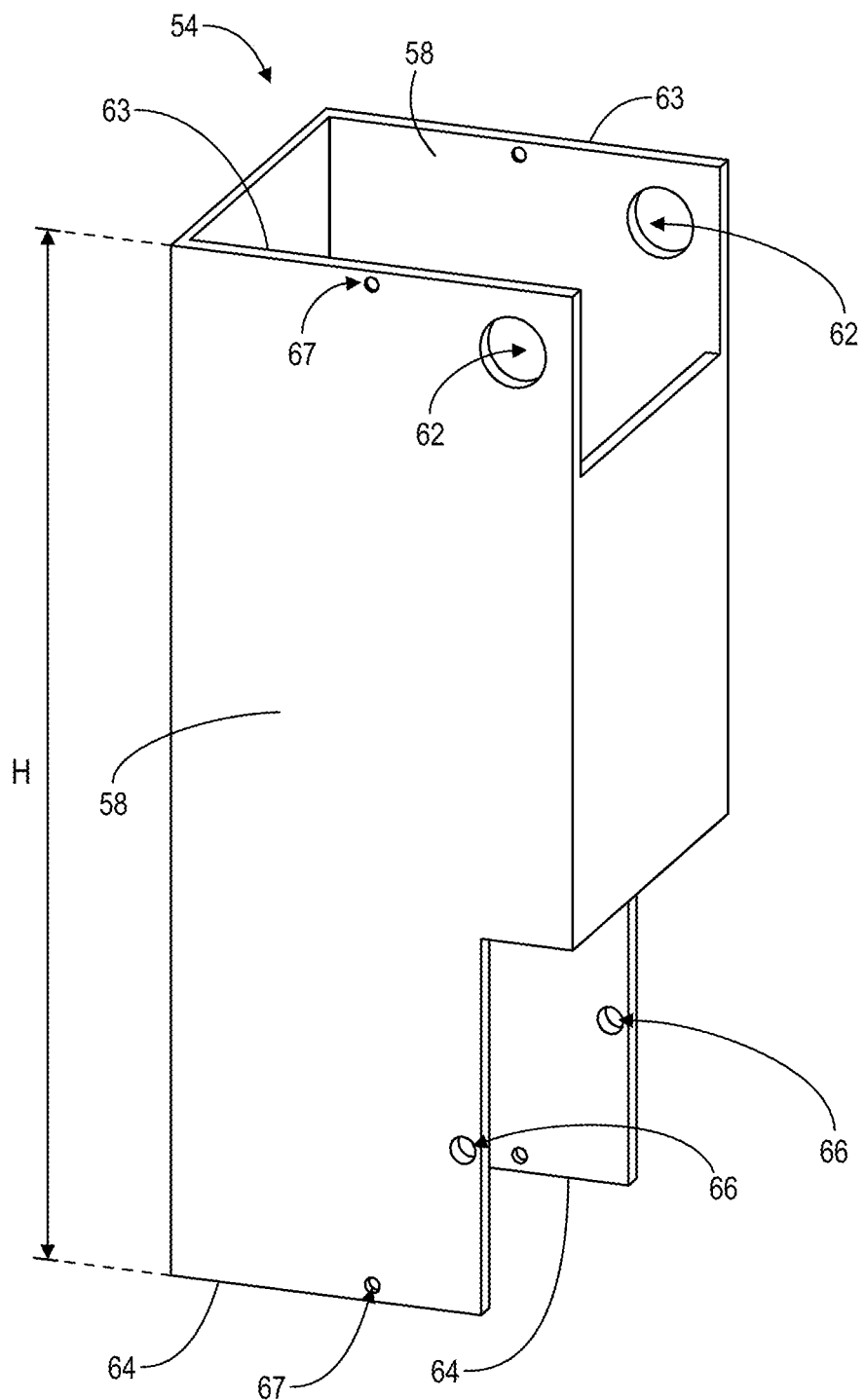
FIG. 5 is a perspective view of a column segment of the frame assembly of FIG. 1.

With reference to FIG. 5, each segment 54 includes two generally L-shaped side faces 58 aligned parallel to one another. The side faces 58 each include a first or upper aperture 62 and a second or lower aperture 66. The upper apertures 62 and the lower apertures 66 of the side faces 58 are aligned respectively, across from one another. In the illustrated embodiment, each segment 54 is approximately 8" tall measured along a vertical height "H" of the side face 58 between a top edge 63 and a bottom edge 64 of the side face 58). Other embodiments include different sizes and shapes (e.g., rectangular, square, etc.) for the segments 54 than that illustrated.

Figure 6:
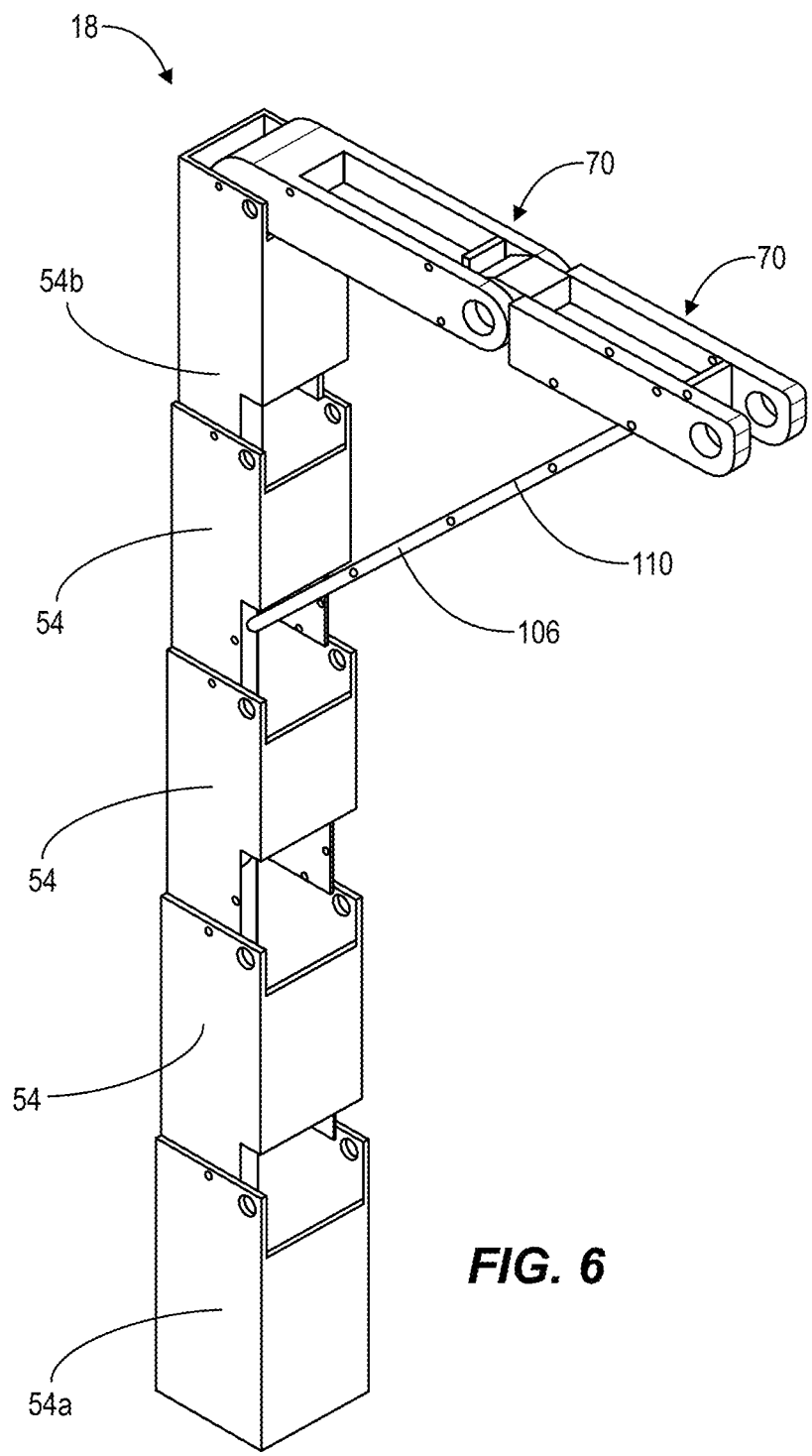
FIG. 6 is a perspective view of a column having column segments of FIG. 5, and links.

With reference to FIG. 6, the plurality of segments 54 are coupled together in a vertical arrangement to form the column 18. In some embodiments the segments 54 are nested together to allow for compact storage, and are then coupled together for example with pins extending through the upper and/or lower apertures 62, 66. The pins may also serve as mounting points for a truss system constructed from links 70 and truss members 106, 110 described further herein. In some embodiments, each segment 54 includes an internal snap fit mount that locks the adjoining segment 54 (e.g., in a raised position relative to the first segment 54). In other embodiments, the segments 54 may be retained (e.g., in the raised position) using pins that are inserted though connecting apertures 67. The use of the segments 54 allows a user to adjust the column 18 to a desired height. In the illustrated embodiment, each segment 54 includes a vertical height H (e.g., 8") and the column 18 is adjustable in increments of the segment height H from a minimum height of H to a maximum height of 5H. In other embodiments, more than five segments 54 may be included to allow for a larger maximum height, or the segment height H may be different (e.g., 2", 4", 6", 10", 12", etc.). In still other embodiments, some segments 54 may have a different segment height than other segments 54.

With reference to FIG. 1, the upper supports 22 extend between the columns 18 parallel to a side of the base 14. In the illustrated embodiment, each upper support 22 is coupled to a top of two of the columns 18. Each upper support 22 includes a plurality of links 70.

Figure 7:
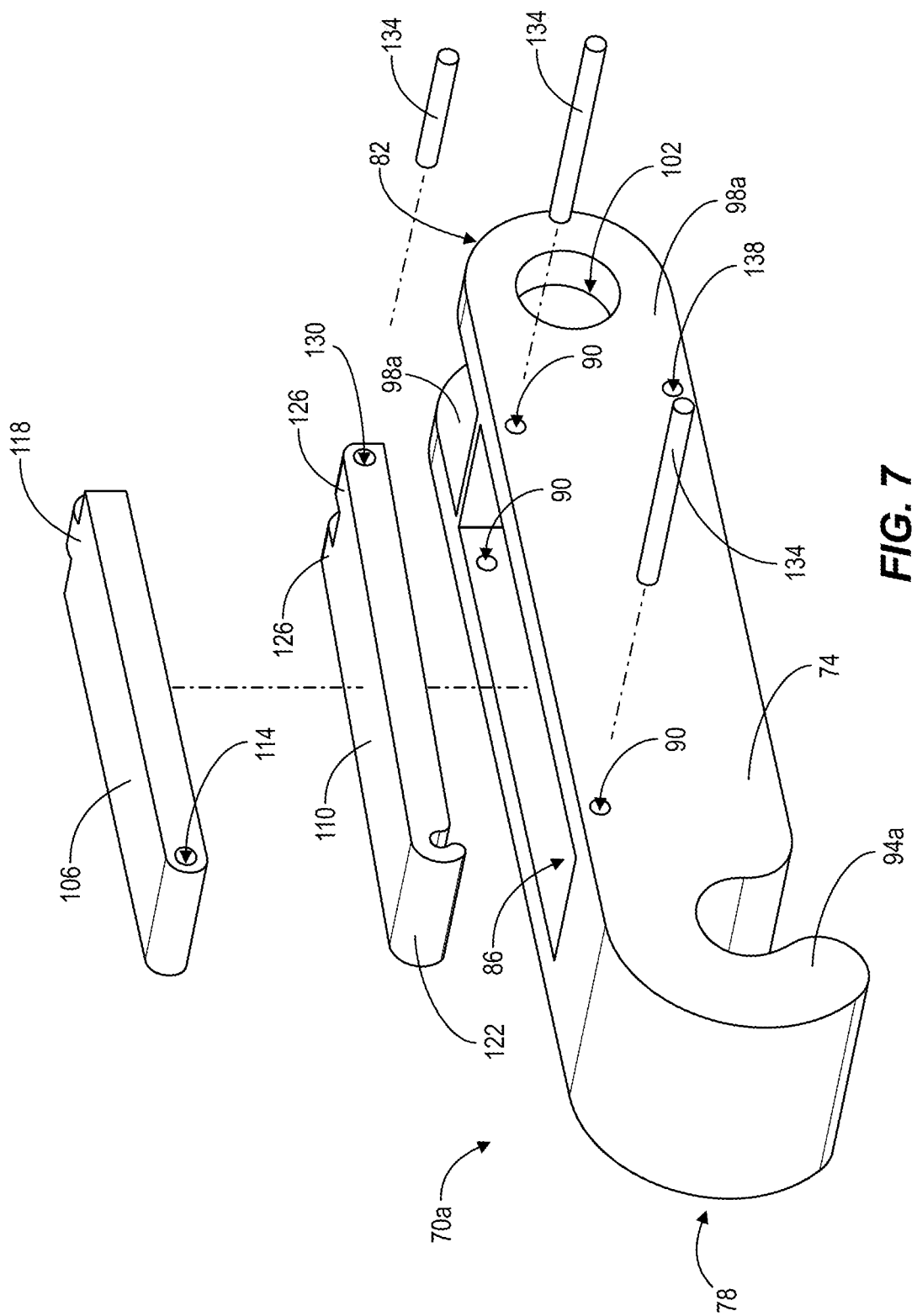
FIG. 7 is an exploded view of one link.
Figure 8:
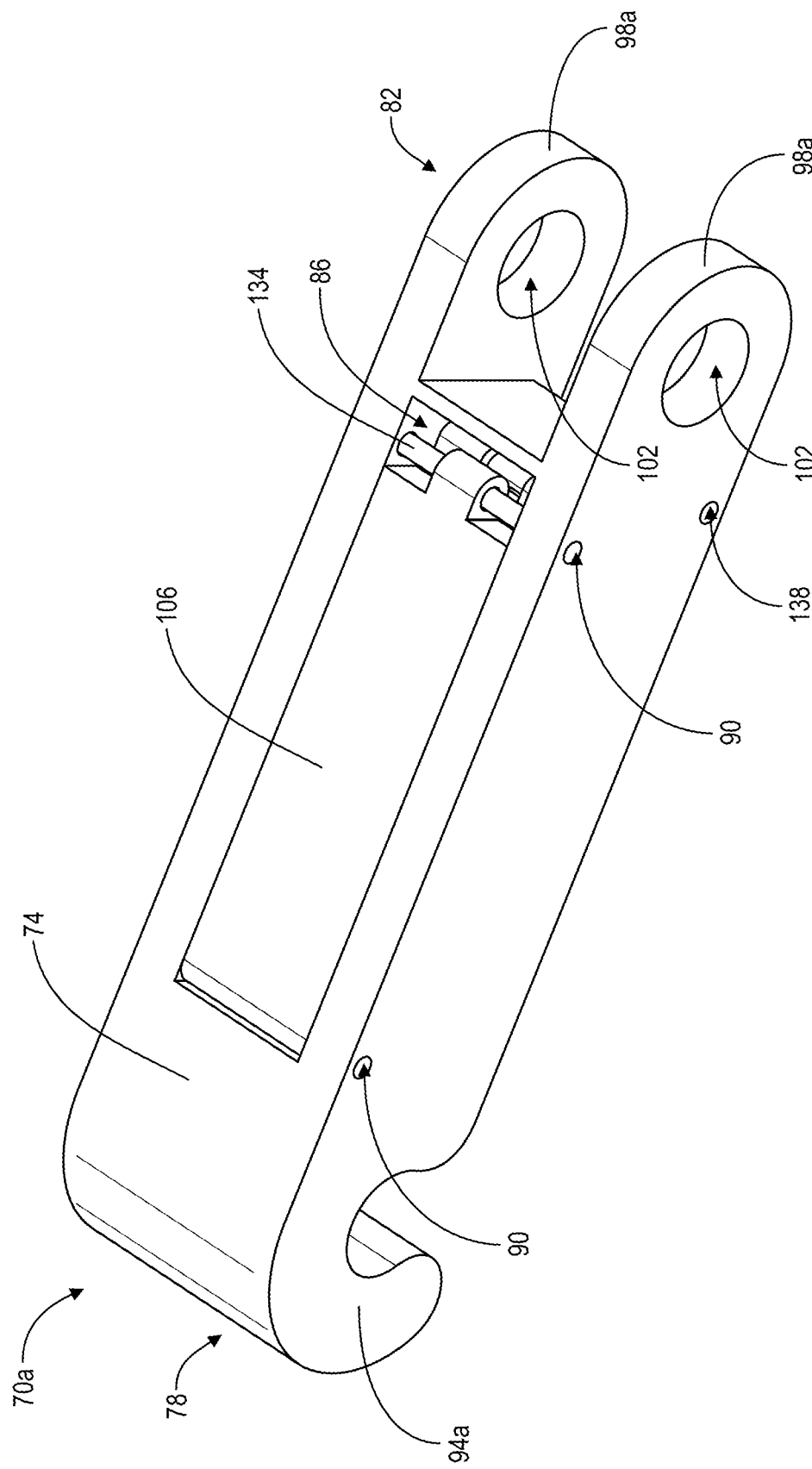
FIG. 8 is a perspective view of the link of FIG. 7, with truss members in a storage position in the link.

With reference to FIGS. 7 and 8, the plurality of links 70 includes a link 70a having a body 74 with a first end 78 and a second end 82. The body 74 includes a cavity 86 and aligned upper apertures 90 disposed on either side of the cavity 86. The first end 78 includes a hook 94a and the second end 82 includes a pair of spaced apart projections 98a, each including an aperture 102.

Figure 9:
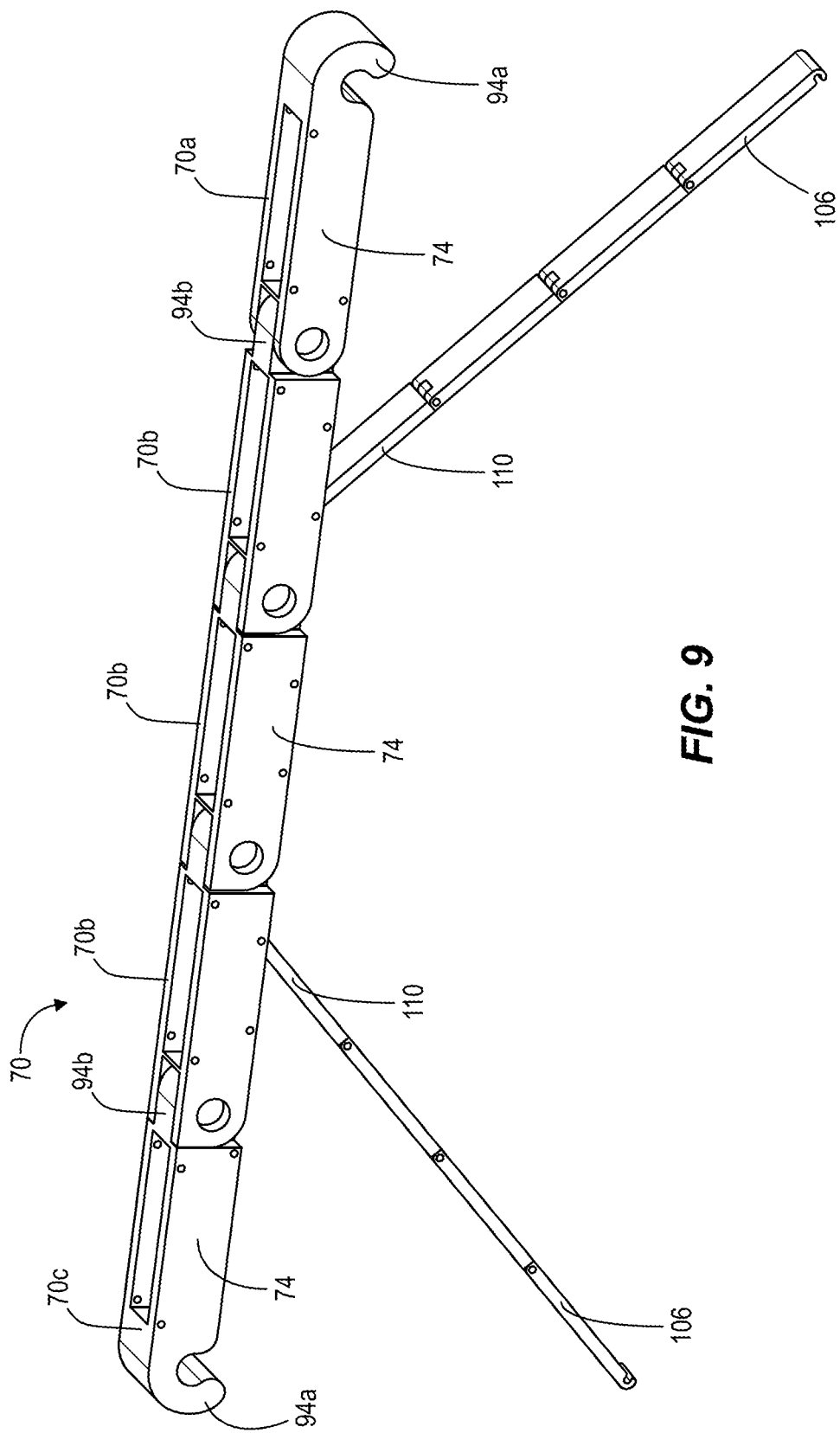
FIG. 9 is a perspective view of an upper support, with links of FIG. 7 in an operating position, and truss members fully extended.

With reference to FIG. 9, the plurality of links 70 also includes links 70b that have hooks 94b disposed in a center of the body 74, having a width less than a width of the body 74, and a link 70c that has a first hook 94a and a second hook 94b.

With reference to FIG. 7, a first truss member 106 and a second truss member 110 are sized and shaped to be stored within the cavity 86. The first truss member 106 includes a bore 114 at a first end and a hook 118 at a second end. In the illustrated embodiment, the hook 118 is disposed in a center of the second end and has a width less than the width of the first truss member 106. The second truss member 110 includes a hook 122 at a first end and a pair of spaced apart projections 126 at a second end. An aperture 130 extends through each of the spaced apart projections 126.

As illustrated in FIG. 8, the truss members 106, 110 are stacked on top of one another and inserted into the cavity 86 when the truss members 106, 110 are not needed. Pins 134 (shown exploded away from the link 70a in FIG. 7) may be inserted through the upper apertures 90 and the respective bore 114 and hook 118 of the first truss member 106 to lock the truss members 106, 110 in place. Alternatively, the pins 134 may be inserted through the upper apertures 90 and the respective hook 122 and apertures 130 of the second truss member 110 if the second truss member 110 is instead on top. In the stored position, the upper truss member 106, 110 (i.e., whichever truss member 106, 110 was inserted into the cavity 86 second), is substantially flush with an upper surface of the link 70a.

With reference to FIG. 9, a plurality of links 70 are coupled together and the truss members 106, 110 are coupled to the plurality of links 70. In the illustrated embodiment, the plurality of links 70 is arranged end to end, so that a hook 94b of one link 70 is positioned between the pair of spaced apart projections 98a of another link, giving the plurality of links 70 a common width along its length. A pin (not shown) may be inserted through the apertures 102 of each pair of spaced apart projections in order to couple the links 70 together. The truss members 106, 110 are coupled together in a similar manner by inserting the pin 134 through an associated hook 122 and pair of apertures 130.

The connected truss members 106, 110 couple to an underside of a link 70. In the illustrated embodiment, each link 70 includes aligned lower apertures 138 (FIG. 7). A pin 134 may be inserted through the lower apertures 138 and into, for example, the aperture 130. The connected truss members 106, 110 are pivotable relative to the links 70.

Returning to FIG. 6, in the illustrated embodiment one of the links 70 is coupled to the uppermost segment 54b of the column 18 and the first truss member 106 is coupled to one of the lower segments 54. A first mounting post or rung (not shown) may be inserted through the pair of upper apertures 62 of the uppermost segment 54b, and the hook 94a may then fit around the first mounting post (e.g., in a snap-fit arrangement) to releasably couple the link 70 to the column 18 via a mechanical and/or frictional engagement. A second mounting post or rung (not shown) may be inserted through the pair of lower apertures 66 of one of the separate, lower segments 54. As illustrated in FIG. 6, the truss members 106, 110 are angled obliquely (e.g., 45°) with respect to the links 70. The hook 122 may releasably couple to the second mounting post (e.g., in a snap-fit arrangement) via a mechanical and/or frictional engagement. The assembly of the plurality of links 70 and the truss members 106, 110 may support a printer head 124 (shown schematically in FIG. 1) above the base 14. The printer head may be coupled for example to a gantry system, which may be supported by the links 70 and the truss members 106, 110. The gantry system would allow the print head to translate anywhere within the print volume 26. The gantry system could be driven by any combination of belts, rack and pinions, power screws, etc.

Returning to FIG. 1, the print volume 26 is adjustable based on the size of the part being printed and the space constraints of the environment. When larger parts are being printed, and space constraints permit, the columns 18 are fully extended and the base 14 includes the maximum number of tiles 30 and plates 42.

Sometimes, however, a smaller print volume 26 is necessary, particularly when space constraints are limited. For example, astronauts have a limited amount of room aboard a spacecraft, but may require a printer that is able to print a variety of sized parts, because there is limited knowledge of what parts and their dimensions may be required for manufacturing on site. Thus, the modular capabilities of the frame assembly 10 allow a user (e.g., an astronaut) to construct the frame assembly 10 with the required footprint and volume 26.

In addition to the limited amount of space for the frame assembly 10 while in use, oftentimes users may work with a limited amount of overall space, and leaving the frame assembly 10 together may be impractical. Thus, the frame assembly 10 is capable of being disassembled in a reverse manner. For example, the links 70 and first truss members 106 are uncoupled from the mounting posts and are returned to the storage position (FIG. 8). The segments 54 are nested within one another, and each tile 30a, 30b and plate 42a, 42b is disconnected into a single piece. The frame assembly 10 may then be stored in a volume less than the print volume 26.

Figure 10A:
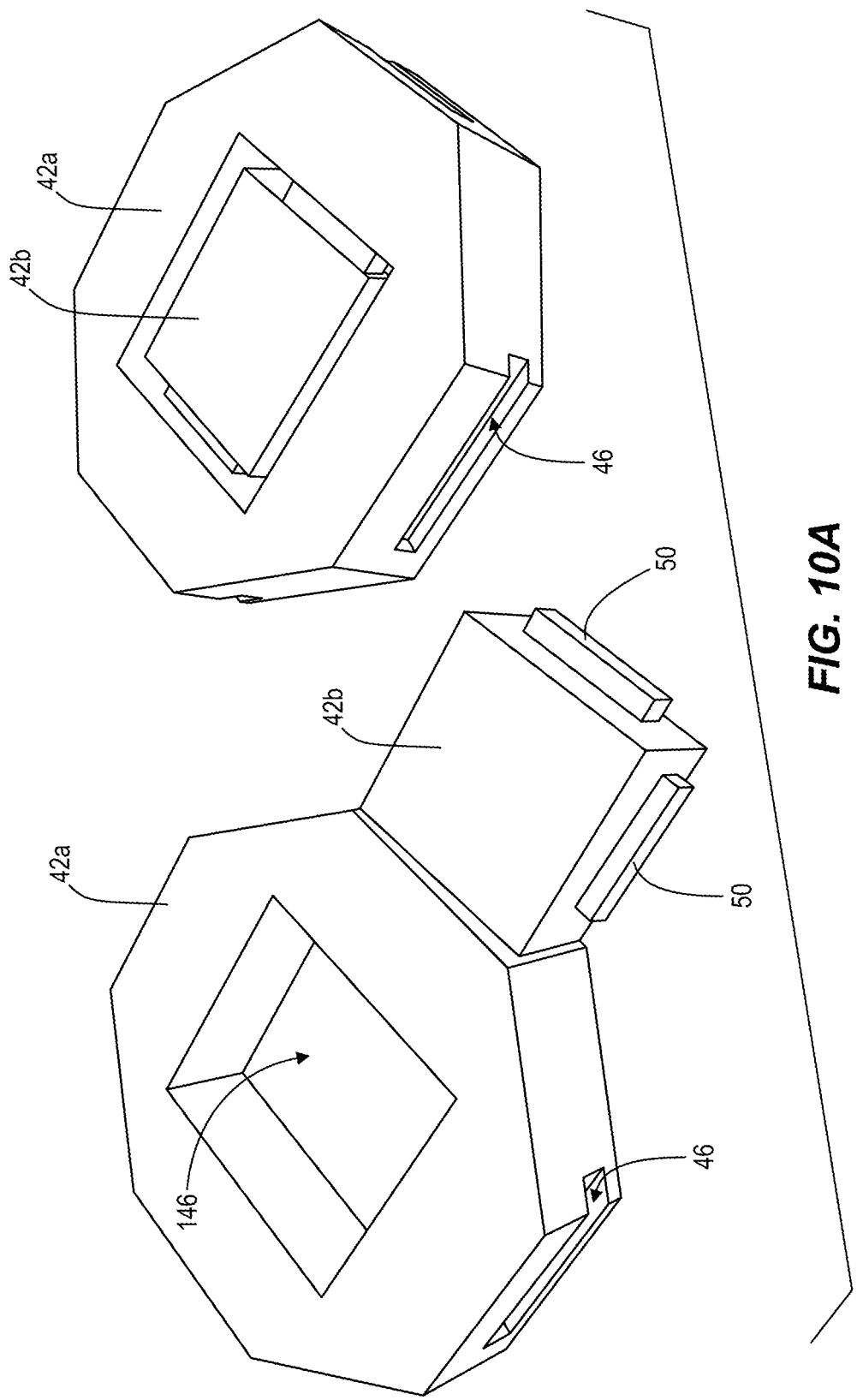
FIG. 10A is a perspective view of the modular plates of FIG. 4 in a storage position.

With reference to FIG. 10A, in the illustrated embodiment each of the first plates 42a includes a recess 146. The recesses 146 have a substantially similar shape and/or volume as the second plates 42b. When not in use, a second plate 42b is received within one of the recesses 146. When inserted, the second plate 42b is substantially flush with the surface of the octagonal plate 42a.

Figure 10B:
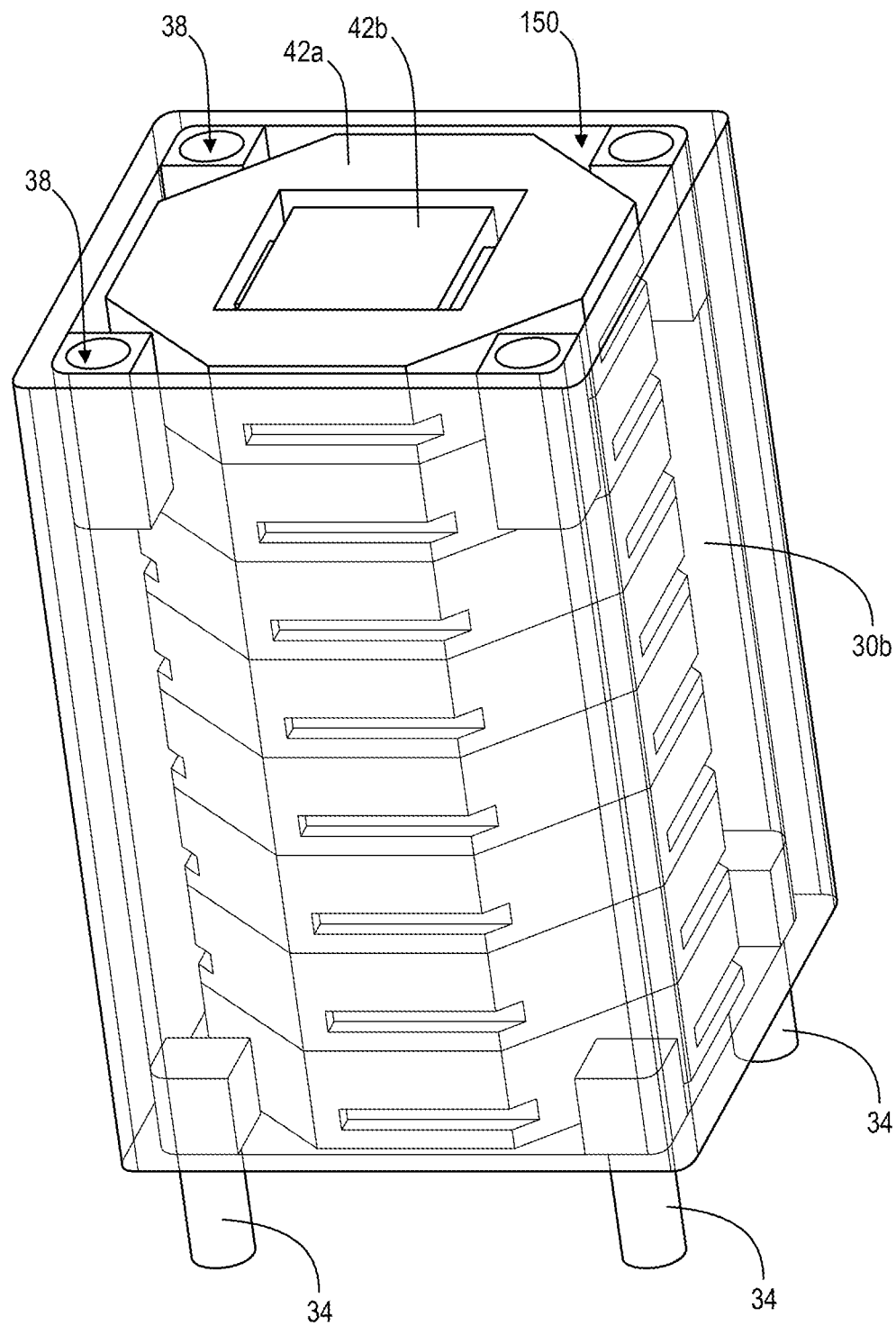
FIG. 10B is a perspective view of the base assembly of FIG. 2 in a storage position.

With reference to FIG. 10B, in the illustrated embodiment the straight pieces 30b are hollow rectangular tubes having channels 150 with a size substantially similar to a size of the first plate 42a. The first plates 42a, with or without the second plates 42b received within the recesses 146, fit within the channel 150. In the illustrated embodiment, eight of the first plates 42a, with eight of the second plates 42b received in respective recesses 146, fit within a single channel 150, thereby allowing the base 14 to be compactly stored.

With reference to FIG. 11, each component of the frame assembly 10 can be stored so that a volume taken up by the disassembled frame assembly 10 is significantly less (e.g., two times less, five times less, ten times less, or other values) than the print volume 26. In the illustrated embodiment, the disassembled volume 154 (i.e., the volume taken up by the tiles 30 with the plates 42 inside, the columns 18 fully disassembled, and the truss members 106, 110 stored within the links 70) is approximately 0.1 meters cubed (e.g., 46.4 cm×23.2 cm×92.8 cm). Other embodiments include different values. The relatively small disassembled volume 154 allows the frame assembly 10 to be compactly stored while not in use.

The embodiment(s) described above and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

What is claimed is:
1. A modular and expandable 3D printer frame comprising:
 frame members configured to be coupled together to form a base defining an inner area, each frame member including at least one coupling member to removably couple the frame member to another of the frame members;
 first modular plates configured to be disposed within the inner area; and second modular plates configured to be disposed within the inner area and removably coupled to the first modular plates, the first and second modular plates configured to together define a printer footprint; and wherein at least one of the frame members is a hollow tube and is configured to receive and store at least one of the first modular plates and the second modular plates.

2. The printer frame of claim 1, wherein at least one of the first modular plates includes a cavity and at least one of the second modular plates is receivable and storable within the cavity.

3. The printer frame of claim 1, wherein the first modular plates include channels and the second modular plates include projections, the projections being slidable into the channels.

4. The printer frame of claim 1, wherein the frame members are coupled together to form the base, the frame further comprising an adjustable column configured to be adjusted between a first height and a second height, the column coupled to the base and extending orthogonally with respect to the printer footprint, the column at least partially defining a printer volume.

5. The printer frame of claim 4, wherein the column is a first column, the 3D printer further comprising,
a second column coupled to the base and spaced apart from the first column, and
an upper support coupled between the first column and the second column, the upper support including a plurality of removable links that are adjustable along a length of the upper support.

6. The printer frame of claim 1, wherein at least one of the first modular plates and the second modular plates is magnetic.

7. The printer frame of claim 1, each of the first plates has an octagonal shape, and wherein each of the second plates has a square shape.

8. The printer frame of claim 1, wherein the frame members are configured to be coupled together such that the base is rectangular, and wherein the first and second plates are configured to be disposed within the inner area defined by the rectangular base.

9. The printer frame of claim 1, further comprising heating elements configured to be magnetically and releasably coupled to upper surfaces of the second plates.

10. The printer frame of claim 1, further comprising segments configured to be coupled together to form a column that extends perpendicularly from the base.

11. The printer frame of claim 10, wherein each segment includes two generally L-shaped side faces aligned parallel to one another, wherein each side face includes a first, upper aperture and a second, lower aperture.

12. The printer frame of claim 11, wherein the upper apertures and the lower apertures of the side faces are aligned with one another.

13. The printer frame of claim 1, further comprising links configured to be coupled together to form an upper support for the printer frame that is spaced from the base.

14. The printer frame of claim 13, wherein each of the links includes a hook at one end of the link.

15. The printer frame of claim 13, wherein one of links includes a cavity, and wherein the printer frame includes a first truss member and a second truss member stored within the cavity.

16. The printer frame of claim 15, wherein the first truss member includes a bore at a first end and a hook at a second end.

17. The printer frame of claim 15, wherein the second truss member includes a hook at a first end and a pair of spaced apart projections at a second end.

18. The printer frame of claim 1, wherein at least one of the frame members is a hollow tube and is configured to receive and store at least one of the first modular plates and the second modular plates, wherein at least one of the first modular plates includes a cavity and at least one of the second modular plates is receivable and storable within the cavity, and wherein the first modular plates include channels and the second modular plates include projections, the projections being slidable into the channels.

19. A printer comprising:
the printer frame of claim 1; and
a print head supported by the printer frame.

20. A modular and expandable 3D printer frame comprising:
a base;
columns extending from the base, each column spaced apart from the other columns, the height of each column adjustable so as to define a volume between the columns and the base;
an upper support coupled between adjacent columns, the upper support having removable links to adjust a distance between the adjacent columns, wherein at least one of the links includes a cavity, wherein the upper support includes truss members configured to be stored within the cavity.

21. The printer frame of claim 20, wherein each column includes segments having a segment height, the height of each column adjustable by multiples of the segment height.

22. The printer frame of claim 20, wherein the columns include rungs and the links include hooks receivable on the rungs.

23. The modular and expandable 3D printer of claim 20, wherein the volume is one meter cubed.

24. The modular and expandable 3D printer of claim 20, wherein the base includes connectable frame members that define an inner area.

25. The modular and expandable 3D printer of claim 12, wherein modular plates are positioned within the inner area and define a printer footprint.

* * * * *